(12) United States Patent
Hoxie et al.

(10) Patent No.: US 11,661,046 B2
(45) Date of Patent: May 30, 2023

(54) PEDAL FEEL EMULATOR ASSEMBLY AND A BRAKE SYSTEM INCLUDING THE PEDAL FEEL EMULATOR ASSEMBLY

(71) Applicant: BWI (Shanghai) Co., Ltd., Shanghai (CN)

(72) Inventors: Steven Glenn Hoxie, Howell, MI (US); Dongqiang Luo, Shanghai (CN)

(73) Assignee: BWI (SHANGHAI) CO., LTD, Shanghai (CN)

( * ) Notice: Subject to any disclaimer, the term of this patent is extended or adjusted under 35 U.S.C. 154(b) by 106 days.

(21) Appl. No.: 17/233,362

(22) Filed: Apr. 16, 2021

(65) Prior Publication Data
US 2022/0332295 A1    Oct. 20, 2022

(51) Int. Cl.
| | | |
|---|---|---|
| *B60T 8/40* | (2006.01) | |
| *B60T 8/1755* | (2006.01) | |
| *B60T 13/16* | (2006.01) | |
| *B60T 8/44* | (2006.01) | |
| *B60T 13/62* | (2006.01) | |

(52) U.S. Cl.
CPC ............ *B60T 8/409* (2013.01); *B60T 8/1755* (2013.01); *B60T 13/165* (2013.01); *B60T 8/44* (2013.01); *B60T 13/62* (2013.01); *B60T 2240/00* (2013.01); *B60T 2260/08* (2013.01); *B60T 2270/306* (2013.01); *B60T 2270/402* (2013.01); *B60T 2270/404* (2013.01); *B60T 2270/82* (2013.01); *B60T 2270/88* (2013.01)

(58) Field of Classification Search
CPC ........................................................ B60T 8/409
See application file for complete search history.

(56) References Cited

U.S. PATENT DOCUMENTS

| | | |
|---|---|---|
| 8,850,810 B2 | 10/2014 | Murayama et al. |
| 9,079,570 B2 | 7/2015 | Sellinger et al. |

(Continued)

FOREIGN PATENT DOCUMENTS

| | | | |
|---|---|---|---|
| CN | 203255179 U | * | 10/2013 |
| CN | 203460854 U | * | 3/2014 |

(Continued)

OTHER PUBLICATIONS

First Office Action and search report dated Apr. 22, 2022 for counterpart Chinese patent application No. 202110598363.X, along with machine EN translation downloaded from EPO.

*Primary Examiner* — Melanie Torres Williams
(74) *Attorney, Agent, or Firm* — William H. Honaker; Dickinson Wright PLLC

(57) ABSTRACT

A pedal feel emulator comprises a housing extending along a center axis between a closed end and an opened end and defining a chamber extending therebetween. A first piston is slidably disposed in the chamber. The first piston defines a compartment in fluid communication with the chamber. A second piston is slidably disposed in the compartment. A spring seat extends radially outwardly from the second piston. A first elastic member is located in the chamber extending between the spring seat and the closed end. A second elastic member is located in the compartment and extending between the spring seat and the first piston. A third elastic member is located between the second piston and the first piston. A brake system including the pedal feel emulator is also disclosed herein.

20 Claims, 2 Drawing Sheets

(56) References Cited

U.S. PATENT DOCUMENTS

| | | | |
|---|---|---|---|
| 9,139,168 B2 | 9/2015 | Jeon | |
| 10,112,592 B2 | 10/2018 | Leiber et al. | |
| 2002/0140286 A1* | 10/2002 | Ishimura | ................ B60T 7/042 |
| | | | 303/155 |
| 2005/0082909 A1 | 4/2005 | Constantakis et al. | |
| 2014/0000254 A1 | 1/2014 | Murayama et al. | |
| 2014/0361473 A1 | 12/2014 | Ryu et al. | |
| 2019/0092307 A1* | 3/2019 | Kim | ........................ G05G 5/05 |
| 2020/0001711 A1 | 1/2020 | Burke et al. | |

FOREIGN PATENT DOCUMENTS

| | | | | |
|---|---|---|---|---|
| CN | 203766733 U | | 8/2014 | |
| CN | 104554200 U | | 4/2015 | |
| CN | 204514608 U | | 7/2015 | |
| CN | 204567627 U | | 8/2015 | |
| CN | 107161121 B | | 9/2017 | |
| CN | 207389175 U | | 5/2018 | |
| CN | 108944845 A | | 12/2018 | |
| CN | 109733356 A | | 5/2019 | |
| CN | 111301379 A | | 6/2020 | |
| CN | 211642145 U | | 10/2020 | |
| CN | 112298139 A | * | 2/2021 | .............. B60T 7/042 |
| DE | 102017002770 A1 | * | 9/2018 | .............. B60T 7/042 |
| JP | 2002293229 A | | 10/2002 | |
| WO | WO-2016125813 A1 | * | 8/2016 | .............. B60T 13/68 |
| WO | 2020152022 A1 | | 7/2020 | |

* cited by examiner

PEDAL FEEL EMULATOR ASSEMBLY AND A BRAKE SYSTEM INCLUDING THE PEDAL FEEL EMULATOR ASSEMBLY

BACKGROUND OF THE INVENTION

1. Field of the Invention

The present invention relates generally to a pedal feel emulator for a brake system.

2. Description of the Prior Art

Electronic brake systems, such as so-called "brake by wire" systems, are increasingly being integrated into or replacing conventional hydraulic brake systems of motor vehicles including passenger cars, SUV's and light trucks. Such electronic brake systems are preferable because they reduce the mass of the system, provide greater ability to integrate the system into the vehicle's other electronic circuits and controls, and are suited for use with sophisticated brake control systems.

During depression of the brake pedal by a vehicle operator in a conventional hydraulic braking system, the hydraulic fluid will exert a reaction force back on the brake pedal due to the hydraulic pressure in the brake lines. Since an electronic brake system may not have such hydraulic pressure at the brake pedal, the vehicle operator will not detect any countering force, which in turn can disorient the operator. Accordingly, a typical electronic brake system will include a brake pedal feel simulator to provide a simulation force on the brake pedal. The simulation force provided by the simulator acts opposite the brake pedal force generated by the vehicle operator and helps the operator modulate the system.

A pedal feel emulator is basically constructed of a hydraulically activated piston compressing a compressible member such as a spring or elastomer. This has been used in the industry to enable the tuning of brake pedal feel in brake systems where in normal operating mode the drivers input through the brake pedal is decoupled hydraulically from the brake calipers.

One such a pedal feel assembly is disclosed in Chinese Utility Model Patent CN211642145U. The pedal feel emulator comprises a housing extending along a center axis between a closed end and an opened end and defining a chamber extending therebetween. A first piston is slidably disposed in the chamber. A second piston is slidably disposed in the chamber and extending between a primary end and a secondary end. A spring seat is located between the first piston and the second piston. A first spring is located in a compartment and extending helically the spring seat and the first piston. A second spring is located in the chamber and extending helically between the spring seat and the closed end.

SUMMARY OF THE INVENTION

The present invention provides a pedal feel emulator assembly that is more compact and easy to assemble. The present invention also provides a pedal feel emulator assembly that has three stages of compression and allows for flexibility in pedal feel tuning. The present invention further provides a pedal feel emulator assembly that overcomes thermal instability issues, e.g. the fluctuation in spring constant caused by heat, in elastomer only designs.

It is one aspect of the present invention to provide a pedal feel emulator assembly. The pedal feel emulator assembly comprises a housing extending along a center axis between a closed end and an opened end. The housing defines a chamber extending between the closed end and the opened end. A first piston is slidably disposed in the chamber. The first piston defines a compartment in fluid communication with the chamber. A second piston slidably disposed in the compartment and extending between a primary end and a secondary end. The primary end is located adjacent to the opened end. The secondary end is adjacent to the closed end. A spring seat extends radially outwardly from the second piston. A first elastic member is located in the chamber extending between the spring seat and the closed end. A second elastic member is located in the compartment and extending between the spring seat and the first piston. A third elastic member is located between the second piston and the first piston.

It is another aspect of the present invention to provide a pedal feel emulator assembly. The pedal feel emulator assembly comprises a housing extending along a center axis between a closed end and an opened end. The housing defines a chamber extending between the closed end and the opened end. A first piston is slidably disposed in the chamber. The first piston defines a compartment in fluid communication with the chamber. A second piston is slidably disposed in the compartment. The second piston extends between a primary end and a secondary end. The primary end is located adjacent to the opened end. The secondary end is adjacent to the closed end. A spring seat extends radially outwardly from the second piston. A first spring is located in the chamber extending between the spring seat and the closed end. A second spring is located in the compartment extending between the spring seat and the first piston. A third elastic member is located between the second piston and the first piston.

It is another aspect of the present invention to provide a brake system. The brake system comprises a master cylinder. A stability control unit is disposed in fluid communication with the master cylinder. At least one wheel brake is in fluid communication with the stability control unit. A pressure supply unit is disposed in fluid communication with the stability control unit for providing a brake fluid pressure to the stability control unit in response to a fluid pressure applied to the master cylinder. A pedal feel emulator is disposed in fluid communication with the master cylinder for providing a resistance force to the master cylinder. The pedal feel emulator comprises a housing extending along a center axis between a closed end and an opened end. The housing defines a chamber extending between the closed end and the opened end. A first piston is slidably disposed in the chamber. The first piston defines a compartment in fluid communication with the chamber. A second piston slidably disposed in the compartment and extending between a primary end and a secondary end. The primary end is located adjacent to the opened end. The secondary end is adjacent to the closed end. A spring seat extends radially outwardly from the second piston. A first elastic member is located in the chamber extending between the spring seat and the closed end. A second elastic member is located in the compartment and extending between the spring seat and the first piston. A third elastic member is located between the second piston and the first piston.

BRIEF DESCRIPTION OF THE DRAWINGS

Other advantages of the present invention will be readily appreciated, as the same becomes better understood by reference to the following detailed description when considered in connection with the accompanying drawings wherein.

DESCRIPTION OF THE ENABLING EMBODIMENT

Figure 1:
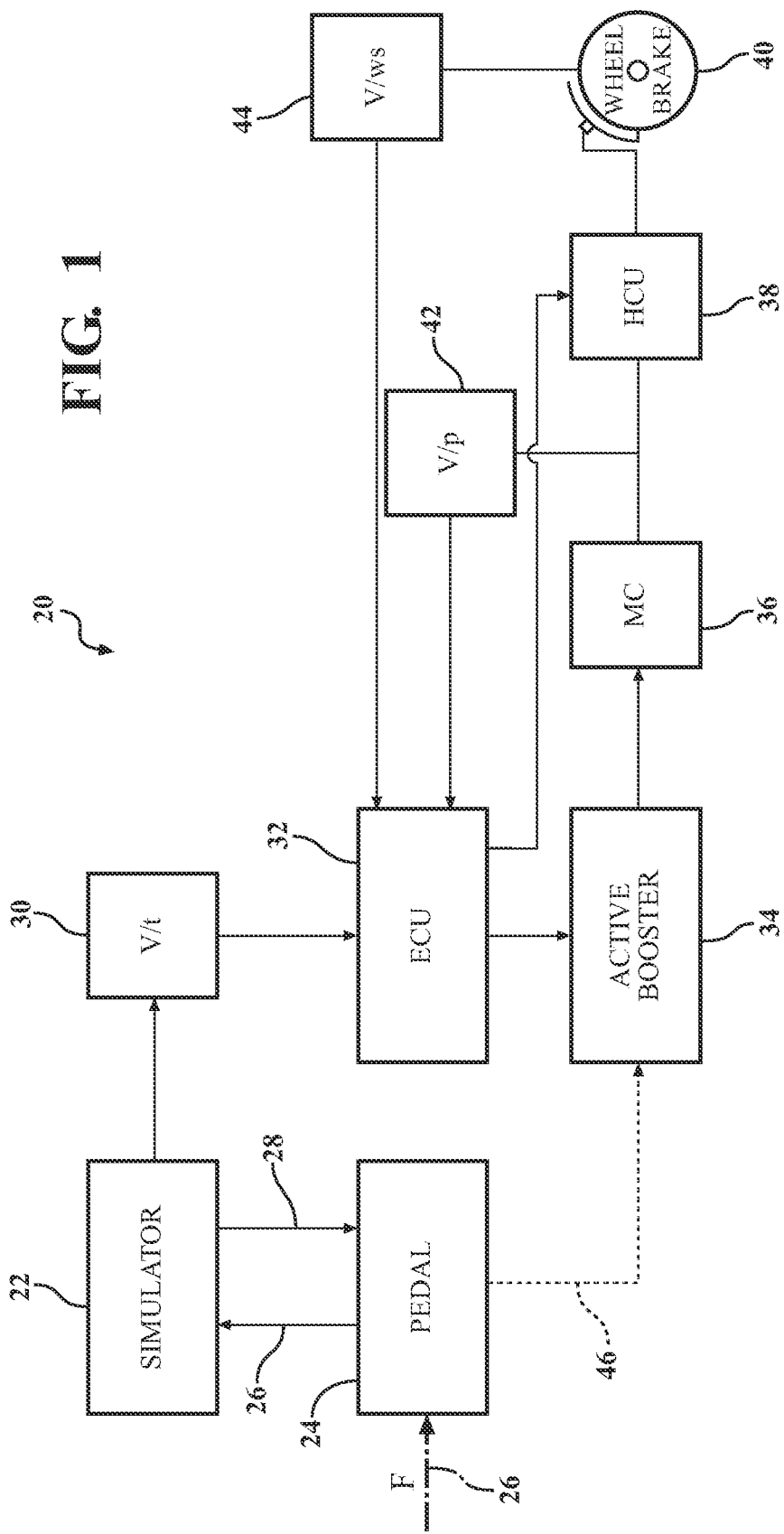
FIG. 1 is a schematic diagraph of an electronic brake system having a pedal feel emulator constructed in accordance with an embodiment of the present invention.

Referring to the Figures, wherein like numerals indicate corresponding parts throughout the several views, a brake system 20, e.g. a brake by wire system, including a pedal feel simulator or a pedal feel emulator assembly 22 constructed in accordance with an embodiment of the present invention is generally shown in FIG. 1.

The braking system 20 includes a brake pedal 24 receiving an input force denoted by arrow 26 from an operator of a vehicle. The input force 26 is transmitted through the brake pedal 24 to the pedal feel emulator assembly 22 which also transmits a simulation/resistance force 28 back to the brake pedal 24. The brake system 20 can include a displacement sensor 30 for monitoring brake pedal travel and transmitting a corresponding signal to an electronic control unit 32. The electronic control unit 32 can be a central control of the braking system 20. The electronic control unit 32 sends a control signal to an active booster 34, which is coupled to a master cylinder 36. The master cylinder 36 is in hydraulic communication with at least one wheel brake 40 through a hydraulic control unit 38 (also referred to as a stability control unit 38). The master cylinder 36 and the active booster 34 together regulate the braking force at the at least one wheel brake 40. The hydraulic control unit 38 and the active booster 34 receive control signals from the electronic control unit 32 for this operation. According to an embodiment of the present invention, the brake system 20 can include a pressure sensor 42 for detecting the hydraulic pressure in the brake line and provides a signal back to the electronic control unit 32. Similarly, a speed sensor 44 can be used to detect wheel speed and provide this information to the electronic control unit 32 for control purposes.

Although FIG. 1 illustrates that the brake pedal 24 is disconnected from the booster 34 and master cylinder 36 during normal operation; however, as indicated by the dashed line 46, during a failure condition, the mechanical connection between the brake pedal 24 and booster 34 is restored in the unlikely event the electronic control unit 32 is unable to effectuate a braking force at the at least one wheel brake 40.

Figure 2:
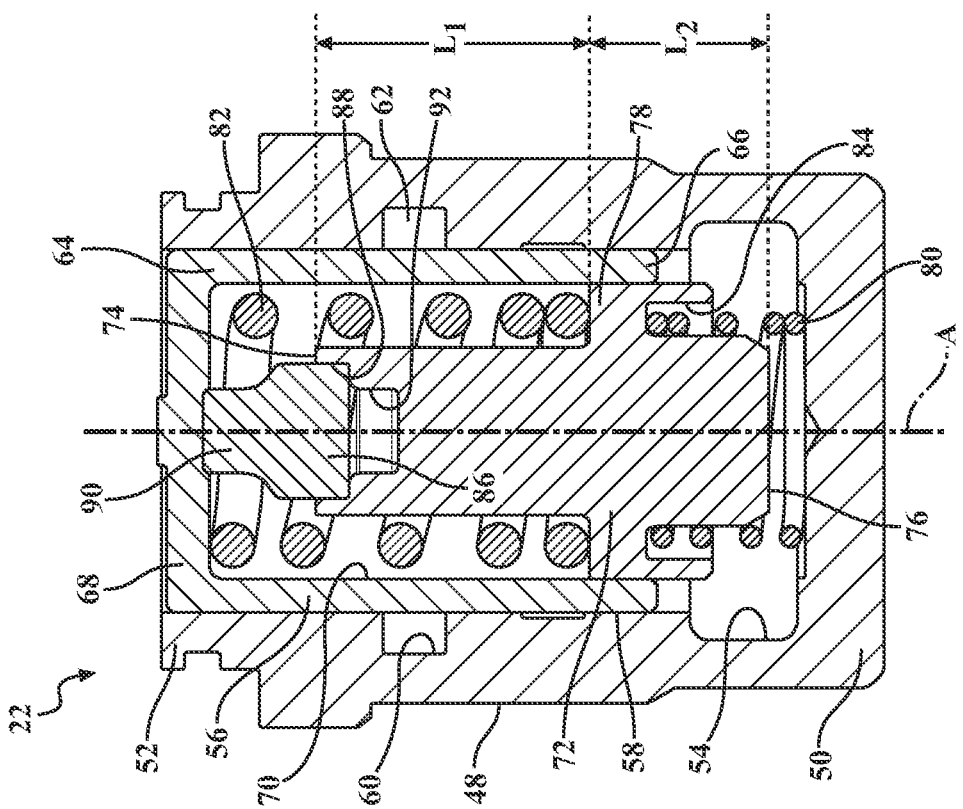
FIG. 2 is a cross-sectional side view of the pedal feel emulator constructed according with an embodiment of the present invention.
Figure 3:
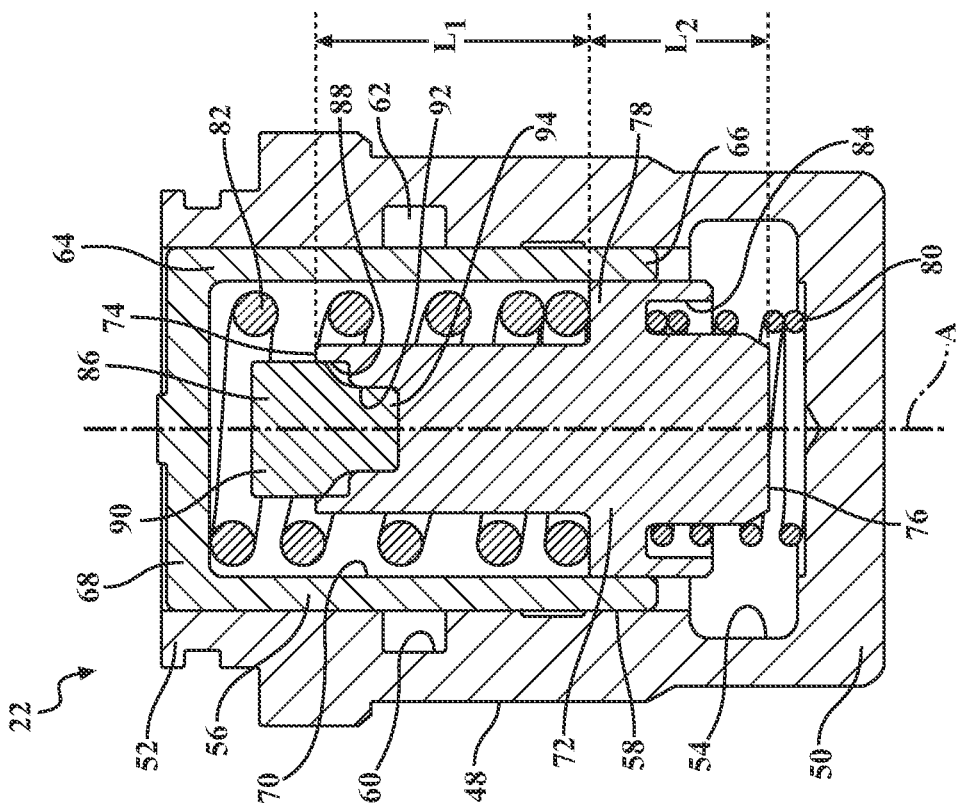
FIG. 3 is a cross-sectional side view of the pedal feel emulator constructed according with another embodiment of the present invention.

According to an embodiment of the present invention, the pedal feel emulator assembly 22 can be hydraulically connected to the master cylinder 36 which generates fluid pressure as a function of a driver pedal input force and travel. As best illustrated in FIGS. 2 and 3, the pedal feel emulator assembly 22 comprises a housing 48, having a generally cylindrical shape, extending along a center axis A between a closed end 50 and an opened end 52. The closed end 50 of the housing 48 can be received in a master cylinder block. The opened end 52 of the housing 48 can be disposed in fluid communication with the master cylinder 36. The housing 48 defines a chamber 54 extending between the closed end 50 and the opened end 52.

A first piston 56, having a generally cylindrical shape, is slidably disposed in the chamber 54. The first piston 56 is adapted to compress in response to a fluid pressure generated by the master cylinder 36. An inner surface 58 of the housing 48 defines at least one recess 60 extending annularly about the center axis A and in fluid communication with the chamber 54. A seal 62 is disposed in the at least one recess 60 extending annularly about the center axis A and in sealing engagement with the first piston 56. The first piston 56 extends along the center axis A between a first end 64 and a second end 66. The first end 64 is located adjacent to the opened end 52. The second end 66 is located adjacent to and axially spaced apart from the closed end 50. A top 68, having a generally circular shape, couples to the first end 64 to close the chamber 54. The first piston 56 defines a compartment 70 extending from the second end 66 to the first end 64. The compartment 70 is in fluid communication with the chamber 54. According to an embodiment of the present invention, the top 68 of the first piston 56 is in a coplanar relationship with the opened end 52 of the housing 48. This arrangement allows the first piston 56 to be flush with the housing 48, thereby providing a more compact pedal feel emulator assembly 22 that can be easily installed on a master cylinder block.

A second piston 72, having a generally cylindrical shape, is slidably disposed in the compartment 70. The second piston 72 extends along the center axis A between a primary end 74 and a secondary end 76. The primary end 74 is located adjacent to and axially spaced apart from the top 68. The secondary end 76 is located adjacent to the closed end 50. A spring seat 78 extends radially outwardly from the second piston 72 and in an abutment relationship with the first piston 56. According to an embodiment of the present invention, the second piston 72 has a first predetermined length $L_1$ extending between the primary end 74 and the spring seat 78. The second piston also has a second predetermined length $L_2$ extending between the spring seat 78 and the secondary end 76. The first predetermined length $L_1$ is greater than the second predetermined length $L_2$.

A first elastic member 80 is located in the chamber 54 extending between the spring seat 78 and the closed end 50. A second elastic member 82 is located in the compartment 70 extending between the spring seat 78 and the top 68 of the first piston 56. Accordingly to an embodiment of the present invention, the first elastic member 80 can be a first spring 80, extending helically about the second piston 72, having a first predetermined stiffness. The second elastic member 82 can be a second spring 82, extending helically about the second piston 72, having a second predetermined stiffness. The second predetermined stiffness is greater than the first predetermined stiffness. Upon receiving a fluid pressure from the master cylinder, this arrangement allows the first spring 80 to compress first relative to the second spring 82. The spring seat 78 defines a groove 84 located in the chamber 54 extending annularly about the center axis A toward the closed end 50 for receiving one end of the first spring 80.

A third elastic member 86 is located in the compartment 70 between the first piston 56 and the second piston 72 for engaging the first piston 56. According to an embodiment of the present invention, the third elastic member 86 has a third predetermined stiffness. The third predetermined stiffness can be any stiffness, because once it engages with the top 68 of the first piston 56, the third elastic member 86 acts in parallel with the second elastic member 82. Thus, the spring constants of the second elastic member 82 and the third elastic member 86 create an additive combined stiffness that is greater than said second predetermined stiffness, resulting in the third stage being stiffer than the second stage regardless of the stiffness of the third elastic member 86. The second elastic member 82 continues to compress as the third elastic member 86 is compressed. As a result, the third stage will always provide high feedback to the driver relative to the compression of the first elastic member 80 and the second elastic member 82. The third elastic member 86 may be made from an elastomeric material. However, the third elastic member 86 may be made of other elastic elements and/or materials. For example, the third elastic member 86 may include a series of one or more Bellville washers. The second piston 72 defines a cavity 88 extending from the primary end 74 toward the secondary end 76 for receiving the third elastic member 86. As best shown in FIGS. 2-3, the third elastic member 86 can include a protrusion 90 located in the compartment 70 extending toward the opened end 52 in an abutment relationship with the first piston 56. As best shown in FIG. 3, the second piston 72 can define a bore 92 in fluid communication with the cavity 88 extending toward the secondary end 76. The third elastic member 86 can include a foundation 94 located in the bore 92 extending toward the secondary end 76 of the second piston 72 in an abutment relationship with the second piston 72. With the first and second elastic members 80, 82 in series and the second and third elastic member 86 being in parallel with the series combination of the first and second two elastic members 80, 82, the desired three stage flexibility in pedal feel tuning can be achieved. This arrangement means that the first stage stiffness is always less than the second stage stiffness, and the second stage stiffness is always less than the third stage stiffness. By varying the stiffness and/or the arrangement of the elastic members 80, 82, 86, one can fine tune the pedal feel feedback to the user/operator. Additionally, with the first elastic member 80 being a first spring, and the second elastic member being a second spring, the present invention is able to overcome thermal instability issues, e.g. the fluctuation in spring constant caused by heat, in elastomer-only designs.

In operation, as a user applies pressure to the brake pedal 24, the displacement sensor 30 monitors the pedal travel and transmits a corresponding signal to an electronic control unit 32. At the same time, the brake pedal force 28 is transmitted to the pedal feel emulator assembly 22 via the brake pedal 24. The pedal feel emulator assembly 22, housed in the master cylinder block, activates in response to the fluid pressure generated. In particular, the first piston 56 and the second piston 72 are activated. Due to the stiffness differential between the first elastic member 80 and the second elastic member 82, the first elastic member 80 first compresses establishing a first stage compression. In other words, because the second predetermined stiffness of the second elastic member 82 is greater than the first predetermined stiffness of the first elastic member 80, the compression/deflection of the second elastic member 82 during the first stage compression is relative low or negligible.

As hydraulic pressure increases, the first elastic member 80 can be compressed as a function of the axial space between the spring seat 78 and the closed end 50 of the housing 48. Thus, the pressure duration of the first stage is governed by, and can be controlled by adjusting, the gap between the spring seat 78 and the closed end 50 of the housing 48. Accordingly, piston travel vs. pressure characteristics are transferred to be governed primarily by the first elastic member 80 to establish a second stage compression.

As hydraulic pressure further increases, the second elastic member 82 can be compressed as a function of the axial space between the top 68 of the first piston 56 and the third elastic member 86. Thus, piston travel vs. pressure characteristics are transferred to be governed primarily by the additive combination of the second elastic member 82 and the third elastic member 86 to establish a third stage compression. The third stage compression may be defined by the third elastic member 86 working in parallel with the second elastic member 82. The pressure increase duration of the second stage compression to the third stage compression is governed by, and can be controlled by adjusting, the axial space between the top 68 of the first piston 56 and the third elastic member 86.

The pedal feel emulator assembly 22 of the present invention incorporates three or more stages and thus able to better simulate the characteristics of a traditional vacuum boosted brake system pedal feel which is also in three stage. The first stage typically represents a low feedback zone in traditional brake booster curves dominated by free travels, e.g. a support force or a jump force. The second stage represents a boosted feedback zone in a traditional vacuum booster system where feedback to the driver is at a medium level. The third stage represents a booster runout phase where feedback input force to input travel ratio at the driver's foot is much higher than in stages one or two.

Obviously, many modifications and variations of the present invention are possible in light of the above teachings and may be practiced otherwise than as specifically described while within the scope of the appended claims. The use of the word "said" in the apparatus claims refers to an antecedent that is a positive recitation meant to be included in the coverage of the claims whereas the word "the" precedes a word not meant to be included in the coverage of the claims.

What is claimed is:

1. A pedal feel emulator assembly comprising:
a housing extending along a center axis between a closed end and an opened end and defining a chamber extending therebetween;
a first piston slidably disposed in said chamber and defining a compartment within the first piston, wherein the compartment is in fluid communication with said chamber;
a second piston slidably disposed in said compartment and extending between a primary end and a secondary end, said primary end being located adjacent to said opened end and said secondary end being adjacent to said closed end;
a spring seat extending radially outwardly from said second piston;
a first elastic member located in said chamber and extending between said spring seat and said closed end;
a second elastic member located in said compartment and extending between said spring seat and said first piston; and
a third elastic member located in said compartment between said second piston and said first piston.

2. The pedal feel emulator assembly of claim 1, wherein said first elastic member is a first spring and said second elastic member is a second spring, said first spring having a first predetermined stiffness and said second spring having a second predetermined stiffness, said first predetermined stiffness being less than said second predetermined stiffness.

3. The pedal feel emulator assembly of claim 2, wherein said third elastic member acts in parallel with said second elastic member to create an additive combined stiffness that is greater than said second predetermined stiffness.

4. The pedal feel emulator assembly of claim 1, wherein said spring seat defines a groove located in said chamber for receiving one end of said first elastic member.

5. The pedal feel emulator assembly according to claim 1, wherein said second piston defines a cavity extending from said primary end toward said secondary end for receiving said third elastic member.

6. The pedal feel emulator assembly according to claim 5, wherein said third elastic member includes a protrusion located in said compartment and extending outwardly from said third elastic member toward said opened end, said protrusion being in an abutment relationship with said first piston.

7. The pedal feel emulator assembly according to claim 5, wherein said second piston defines a bore in fluid communication with said cavity extending toward said secondary end.

8. The pedal feel emulator assembly according to claim 7, wherein said third elastic member includes a foundation located in said bore extending toward said secondary end, said foundation being in an abutment relationship with said second piston.

9. The pedal feel emulator assembly according to claim 1, wherein said second piston has a first predetermined length between said primary end and said spring seat and a second predetermined length between said spring seat and said secondary end, said first predetermined length being greater than said second predetermined length.

10. A pedal feel emulator assembly comprising:
a housing extending along a center axis between a closed end and an opened end and defining a chamber extending therebetween;
a first piston slidably disposed in said chamber and defining a compartment within the first piston, wherein the compartment is in fluid communication with said chamber;
a second piston slidably disposed in said compartment and extending between a primary end and a secondary end, said primary end being located adjacent to said opened end and said secondary end being adjacent to said closed end;
a spring seat extending radially outwardly from said second piston;
a first spring located in said chamber and extending between said spring seat and said closed end;
a second spring located in said compartment and extending between said spring seat and said first piston; and
a third elastic member located in said compartment between said second piston and said first piston.

11. The pedal feel emulator assembly according to claim 10, wherein said first spring has a first predetermined stiffness and said second spring has a second predetermined stiffness, said first predetermined stiffness being less than said second predetermined stiffness.

12. The pedal feel emulator assembly according to claim 11, wherein said third elastic member acts in parallel with said second spring to create an additive combined stiffness that is greater than said second predetermined stiffness.

13. The pedal feel emulator assembly according to claim 10, wherein said second piston has a first predetermined length between said primary end and said spring seat and a second predetermined length between said spring seat and said secondary end, said first predetermined length being greater than said second predetermined length.

14. The pedal feel emulator assembly according to claim 10, wherein said second piston defines a cavity extending from said primary end toward said secondary end for receiving said third elastic member.

15. The pedal feel emulator assembly according to claim 14, wherein said third elastic member includes a protrusion located in said compartment and extending outwardly from said third elastic member toward said opened end, said protrusion being in an abutment relationship with said first piston.

16. The pedal feel emulator assembly according to claim 14, wherein said second piston defines a bore in fluid communication with said cavity and extending toward said secondary end; and
wherein said third elastic member includes a foundation located in said bore extending toward said secondary end of said second piston, said foundation being in an abutment relationship with said second piston.

17. A brake system comprising:
a master cylinder;
a stability control unit in fluid communication with said master cylinder;
at least one wheel brake in fluid connection with said stability control unit;
a pressure supply unit in fluid communication with said stability control unit for providing a brake fluid pressure to said stability control unit in response to a fluid pressure applied to said master cylinder;
a pedal feel emulator in fluid communication with said master cylinder for providing a resistance force to said master cylinder, said pedal feel emulator comprising:
a housing extending along a center axis between a closed end and an opened end and defining a chamber extending therebetween;
a first piston slidably disposed in said chamber and defining a compartment within the first piston, wherein the compartment is in fluid communication with said chamber;
a second piston slidably disposed in said compartment and extending between a primary end and a secondary end, said primary end being located adjacent to said opened end and said secondary end being adjacent to said closed end;
a spring seat extending radially outwardly from said second piston;
a first elastic member located in said chamber and extending between said spring seat and said closed end;
a second elastic member located in said compartment and extending between said spring seat and said first piston; and
a third elastic member located in said compartment between said second piston and said first piston.

18. The brake system according to claim 17, wherein said second piston defines a cavity extending from said primary end toward said secondary end for receiving said third elastic member.

19. The brake system according to claim 18, wherein said third elastic member includes a protrusion located in said compartment and extending toward said opened end, said protrusion being in an abutment relationship with said first piston.

20. The brake system according to claim 18, wherein said second piston defines a bore in fluid communication with said cavity extending toward said secondary end; and wherein said third elastic member includes a foundation located in said bore extending toward said secondary end, said foundation being in an abutment relationship with said second piston.

\* \* \* \* \*